United States Patent
Godar

(10) Patent No.: US 11,394,944 B2
(45) Date of Patent: Jul. 19, 2022

(54) IMAGE PROCESSING DEVICE AND SYSTEM FOR OUTPUTTING HIGHER-RESOLUTION VIDEOS

(71) Applicant: Sony Interactive Entertainment Inc., Tokyo (JP)

(72) Inventor: Anthony William Godar, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/619,738

(22) PCT Filed: Jun. 5, 2018

(86) PCT No.: PCT/GB2018/051527
§ 371 (c)(1),
(2) Date: Dec. 5, 2019

(87) PCT Pub. No.: WO2018/224814
PCT Pub. Date: Dec. 13, 2018

(65) Prior Publication Data
US 2020/0204779 A1 Jun. 25, 2020

(30) Foreign Application Priority Data
Jun. 9, 2017 (GB) .................................. 1709202

(51) Int. Cl.
*H04N 13/117* (2018.01)
*H04N 13/106* (2018.01)
*H04N 13/161* (2018.01)

(52) U.S. Cl.
CPC ......... *H04N 13/117* (2018.05); *H04N 13/158* (2018.05); *H04N 13/161* (2018.05)

(58) Field of Classification Search
CPC ............................ H04N 13/117; H04N 13/161
See application file for complete search history.

(56) References Cited

U.S. PATENT DOCUMENTS

| 10,412,413 | B2 | 9/2019 | Izumi | |
| 2004/0086186 | A1* | 5/2004 | Kyusojin | H04N 7/181 382/232 |

(Continued)

FOREIGN PATENT DOCUMENTS

| EP | 2395754 A1 | 12/2011 |
| EP | 3145201 A1 | 3/2017 |

(Continued)

OTHER PUBLICATIONS

International Search Report and Written Opinion for corresponding PCT Application No. PCT/GB2018/051527, 13 pages, dated Aug. 22, 2018.

(Continued)

*Primary Examiner* — Zhubing Ren
(74) *Attorney, Agent, or Firm* — Matthew B. Dernier, Esq.

(57) ABSTRACT

A video providing device for providing video content having a plurality of viewpoints, the device including a video storage unit operable to store a plurality of versions of a video for each of a plurality of viewpoints in the video content, each video corresponding to the same viewpoint being encoded with a different resolution and a different group of pictures duration, a viewpoint determining unit operable to determine a requested viewpoint in the video content, a video selection unit operable to select a video from amongst the plurality of versions corresponding to the requested viewpoint, the selected video having a next-occurring group of pictures boundary, a video transmitting unit operable to transmit the selected video to a video receiving device, and a video switching unit operable to, if the selected video is not the highest-resolution video corresponding to that viewpoint, perform successive switches to higher-resolution videos at the next-occurring group of pictures boundary in a higher-resolution video until a switch (Continued)

is performed to the highest-resolution video for the determined viewpoint, where the video transmitting unit is operable to transmit a switched video instead of the selected video.

15 Claims, 6 Drawing Sheets

(56) References Cited

U.S. PATENT DOCUMENTS

| | | | |
|---|---|---|---|
| 2007/0047925 A1* | 3/2007 | Araki | G11B 27/36 |
| | | | 386/334 |
| 2010/0118938 A1 | 5/2010 | Fuchs | |
| 2013/0089156 A1* | 4/2013 | Gautier | H04N 21/4384 |
| | | | 375/240.25 |
| 2014/0253694 A1 | 9/2014 | Zustak | |
| 2014/0269932 A1* | 9/2014 | Su | H04N 21/2381 |
| | | | 375/240.25 |
| 2016/0042554 A1 | 2/2016 | Ogan | |
| 2016/0105644 A1* | 4/2016 | Smith | H04N 5/23206 |
| | | | 348/159 |
| 2016/0360180 A1* | 12/2016 | Cole | H04N 19/597 |
| 2018/0027257 A1 | 1/2018 | Izumi | |
| 2018/0176468 A1* | 6/2018 | Wang | H04N 5/23238 |
| 2018/0220119 A1* | 8/2018 | Horvitz | H04N 21/234363 |
| 2018/0310010 A1* | 10/2018 | Hourunranta | H04N 19/597 |
| 2019/0158815 A1* | 5/2019 | He | H04N 21/234345 |
| 2019/0174150 A1* | 6/2019 | D'Acunto | H04N 21/26258 |

FOREIGN PATENT DOCUMENTS

| | | |
|---|---|---|
| JP | 10191261 A | 7/1998 |
| JP | 2012508536 A | 4/2012 |
| WO | 2016140060 A1 | 9/2016 |
| WO | 2017138994 A1 | 8/2017 |

OTHER PUBLICATIONS

Combined Search and Examination report for corresponding GB Application No. GB1709202.4, 3 pages, dated Nov. 7, 2017.
Communication Pursuant to Article 94(3) for corresponding EP Application No. 18730092.6, 5 pages, dated Oct. 5, 2021.
Notification of Reasons for Refusal for corresponding JP Application No. 2019566617, 16 pages, dated Feb. 1, 2022.

* cited by examiner

300

310

320

330

IMAGE PROCESSING DEVICE AND SYSTEM FOR OUTPUTTING HIGHER-RESOLUTION VIDEOS

BACKGROUND

This invention relates to an image processing device and system.

Immersive video content has become increasingly widespread in recent years, with panoramic and even 360 degree video content being generated increasingly often. Such content is able to be navigated by a user in some manner to simulate being in the location in which the content is captured and looking around. This navigation may be performed using inputs via a controller or the like, or may be linked to the movement of a device operated by a user; for example, the user could reposition or rotate their phone to cause a change in the viewpoint.

In other arrangements, a head mountable display (HMD) is used to present such content to a user. This may be advantageous, as the user can simply move their head in order to cause a change in the displayed viewpoint; this is an intuitive interaction with the content that further increases the sense of immersion.

One problem associated with the provision of video content that encompasses a plurality of viewpoints is that of the file size of the video content. There is a trade-off between video quality and the file size; the higher quality the video content, the larger the corresponding file size and as a result the greater the bandwidth requirements for transmitting the content to a display device. Understandably, there is a desire to provide the maximum possible video quality so as to ensure a good user experience; however due to bandwidth restrictions there is a limit to how much data can be used.

It is therefore common that lower-than-desired resolution content is provided (for example, using a 4K resolution image for a sphere can result in a viewpoint that has a resolution of 1000×1000 pixels being displayed) in order to reduce the file size to a reasonable level. This can cause further degradation in display quality, as this is lower than the resolution of many displays that are currently available.

One solution that has been previously proposed is that of capturing a very high resolution video, and then using this to generate a plurality of videos each having a different area of the video in high quality and the rest in low quality. This mitigates the problems described above, by providing a high-quality image in the direction of viewing whilst maintaining a small bandwidth requirement, but in doing so generates further problems such as that of a delay that is caused by having to switch videos when the viewer changes their viewpoint in order to provide a high quality image in the direction of view.

SUMMARY

The presently proposed arrangement seeks to mitigate the above problems.

Various aspects and features of the present invention are defined in the appended claims and within the text of the accompanying description and include at least a video providing device, a video receiving device, a method of operating each of these devices, and a computer program.

BRIEF DESCRIPTION OF THE DRAWING

Embodiments of the invention will now be described, by way of example only, with reference to the accompanying drawings, in which.

DETAILED DESCRIPTION

Figure 1:
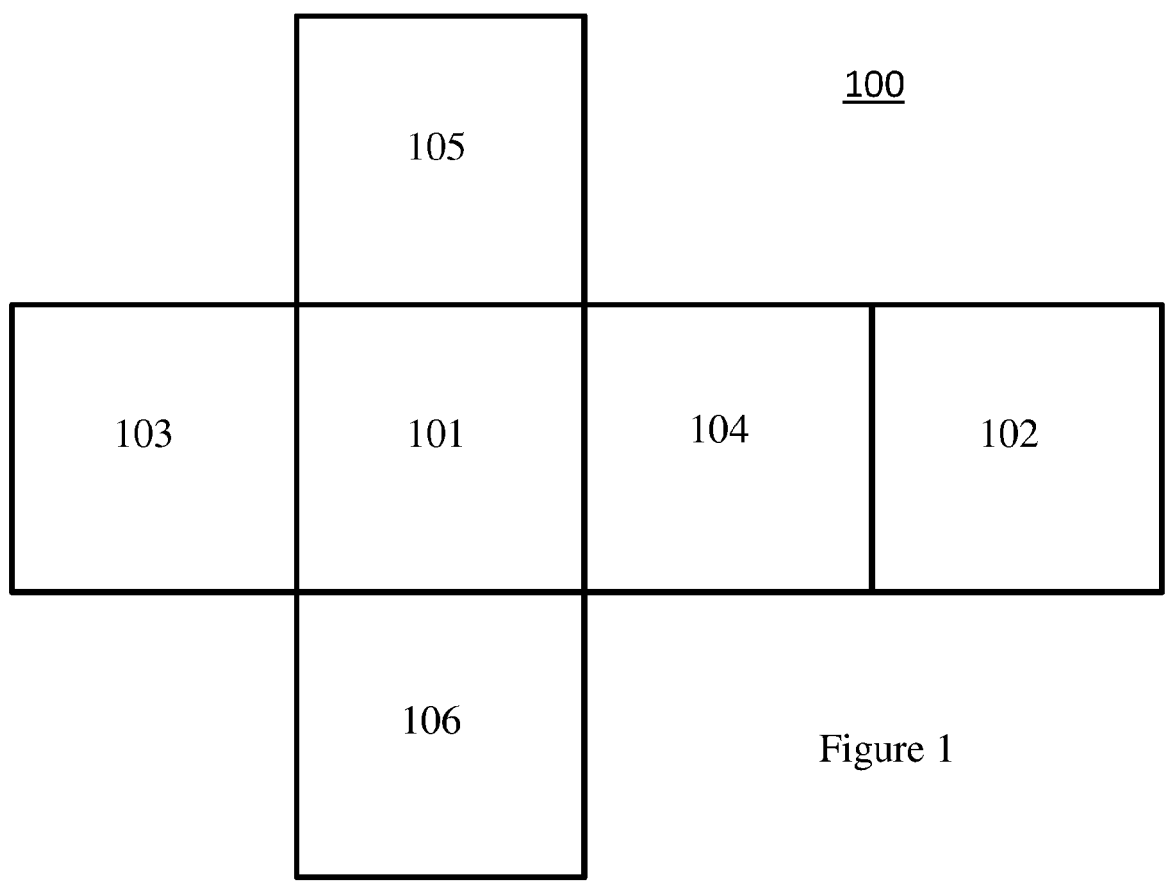
FIG. 1 schematically illustrates a video mapping layout.

When providing 360 degree video content, or indeed any content that covers an area larger than that which may be viewed by a user at a single time, it may be desirable to map the video to a shape other than a sphere in order to simplify playback. For example, the video content could be mapped to a cube in order to provide six video tiles that between them represent the whole of the video content. FIG. 1 schematically illustrates a plan view of such a cube 100, with which six viewpoints are provided. Of course any suitable mapping could be used, rather than being limited to a cube, so as to provide any number of viewpoints.

The cube 100 comprises a front view 101, rear view 102, left view 103, right view 104, up view 105 and down view 106. These directions may be defined in any manner; for example the so-called 'front view' could simply be the direction in which the viewer is looking and so could vary throughout the playback of the content. The naming convention used is not essential, so long as the viewpoints can be distinguished and correctly identified.

In some embodiments, the front view is defined as a particular tile and is constant for a particular stream. In the example of FIG. 1, six separate streams could be provided to allow for adaptive streaming; each of these comprising only a single, high-resolution tile.

As noted above, such an arrangement is advantageous in that by selecting a particular stream, the viewer can be provided with video content that is of high display quality in a direction of view without having to stream high-quality video content for each direction of view at the same time. However, a problem associated with such an arrangement is that a delay is experienced before the viewer is presented with high quality video content for a new viewpoint after changing their direction of view. During the time of the delay, the viewer is left viewing content corresponding to the earlier viewing direction which can result in a break in the immersion experienced by a viewer.

In the present disclosure, video content is provided in a format that utilises a group of pictures (GOP) format. One restriction of this is that switching may only be performed at the GOP boundary in the target video, and therefore if the viewer changes their viewpoint at any other time then the change in which video is displayed is delayed until the next GOP boundary. This may result in a delay of a whole second in many current videos, depending on the GOP duration, which may be too high a latency to go unnoticed by a user—especially in a virtual reality application.

While this latency could be reduced by simply using a shorter GOP, changing only this aspect of a transmitted video would increase the bandwidth requirements significantly and thus prove to be problematic in other ways.

Embodiments according to the present disclosure address this by providing a plurality of videos for each viewpoint. Each video within a plurality comprises the same content, but encoded such that each video has a different resolution and different GOP duration to each other video corresponding to that same viewpoint.

Figure 2A:
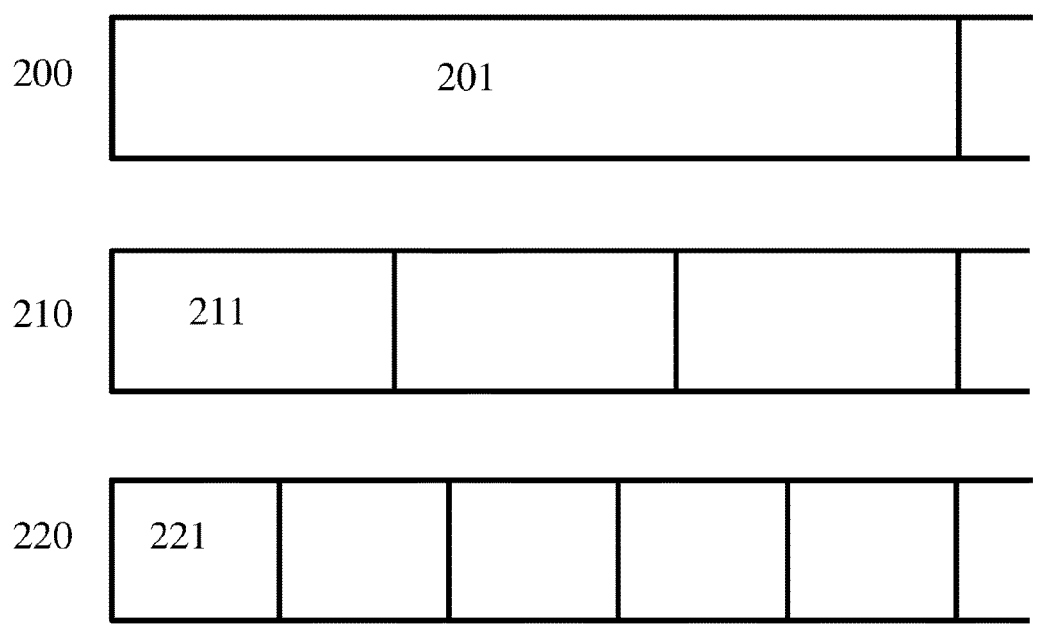
FIG. 2A schematically illustrates a plurality of videos corresponding to a single viewpoint.

FIG. 2A schematically illustrates a plurality of videos 200, 210, and 220 corresponding to a single viewpoint.

Video 200 is the video with the highest resolution (for example, a 4K video), the video 200 comprising a plurality of GOPs 201 with the longest GOP duration of the plurality of videos. The video 200 is generally the most desirable display video, as it has the highest level of detail; however the long GOP duration means that there may be a rather significant lag when changing viewpoints. The long GOP duration is advantageous as it can result in significant bit rate savings, and decreasing the GOP duration so as to enable more responsive switching may significantly increase the bit rate—therefore maintaining a long GOP duration can be desirable despite this drawback. Therefore, in some embodiments, videos having a higher resolution also have a longer GOP duration. The GOP duration could be determined for each video in view of maintaining a constant bit rate across all video resolutions that may be transmitted.

Video 210 is a video with a lower, but still reasonably high, resolution (for example, a 2K video); the resolution is generally sufficiently high that this video 210 is likely to still appear of good quality to a viewer. It is noted that the GOP 211 in this video 210 has a shorter GOP duration (one third of the duration of that of the GOP 201; although this should not be seen as limiting as any GOP duration shorter than that of GOP 201 may be appropriate) enabling more responsive video switching.

Video 220 is a video with a lower quality still (for example, a 1K video) and has a GOP 221 with a shorter GOP duration than those used in the videos 200 and 210. The GOP duration used in the video 220 is shown to be one fifth of that of the video 200 although, as above, this should not be seen as limiting.

Figure 2B:
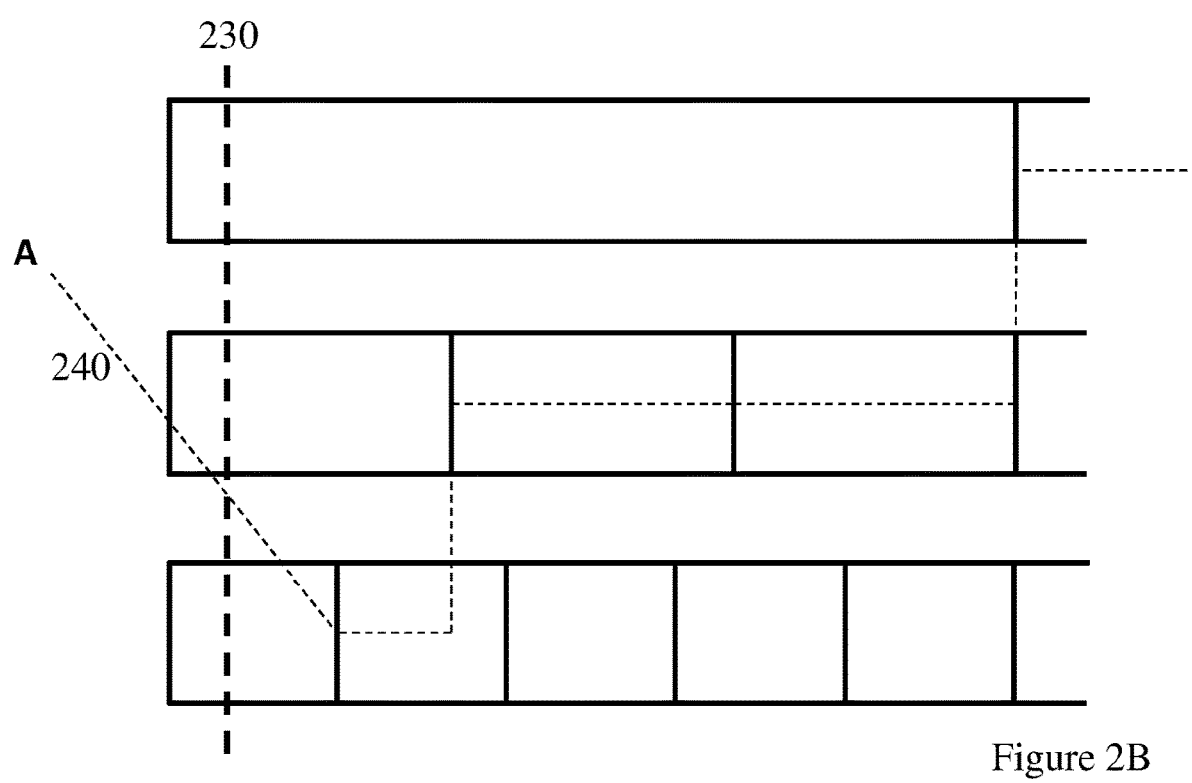
FIGS. 2B, 2C and 2D schematically illustrate video switching processes.

FIG. 2B schematically illustrates an exemplary video switching process performed using the videos in FIG. 2A. At a time represented by the line 230, a requested viewpoint changes from A to a second viewpoint that is represented by the videos 200, 210 and 220; such a change could be in response to a viewer rotating their head while wearing an HMD, for example. The second dashed line represents a video switching path 240, which is used to schematically plot the video switching process. The first GOP boundary occurring after the time 230 appears in the lowest-resolution video 220, and as a result video switching is performed such that the second GOP in the video 220 is transmitted.

The next-occurring GOP boundary in a video of a higher resolution is that of the boundary between the first and second GOPs in the video 210. At this boundary, the video is switched again such that the second GOP of the video 210 is transmitted. The third GOP of video 210 is also transmitted, as the next GOP boundary in the higher-resolution video 200 does not occur until the end of the third GOP of video 210. Transmission of the video 200 begins at this GOP boundary, providing the user with the highest-resolution video until a change in viewpoint is next requested.

It is therefore apparent that in such an arrangement instead of waiting from the time 230 until the next GOP boundary in video 200 (which may be as high as several seconds, in some embodiments), the user may be provided with the desired viewpoint with a much smaller latency. While the quality of the intermediate video content is generally lower, it is considered to be more important to reduce a video switching latency than to maintain a higher-quality image in many applications.

While only three videos of different resolutions are shown in these Figures, it would be appreciated by the skilled person that any number could be provided. It is possible, and indeed likely if a greater number of videos are provided, that GOP boundaries of different videos may align. In this case, it is envisioned that the highest-resolution video of those would usually be selected if the shared GOP boundary time is the next time for switching to be performed.

Figure 2C:
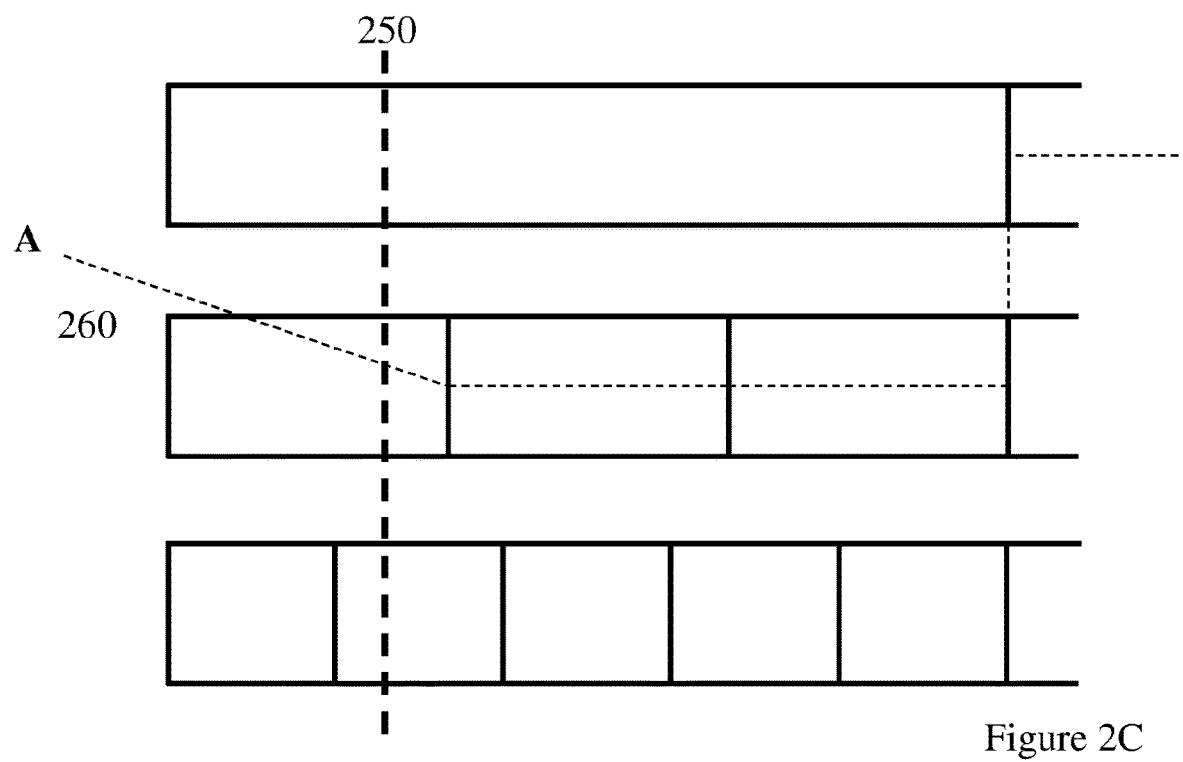

FIG. 2C schematically illustrates a second switching process using the same videos 200, 210, and 220 as in the Figures above. In this Figure, a video switching time 250 is used instead and a different line illustrates the video switching path 260.

The video switching time 250 occurs after the first GOP boundary of video 220 in this example, and therefore the first-occurring GOP boundary is instead found in the video 210. A switch from a video representing viewpoint A to video 210 may therefore be performed directly without having to transmit any content from video 220. As in the example referring to FIG. 2B, a switch is performed to video 200 at the next-occurring GOP boundary.

FIG. 2C therefore illustrates that not each of the available videos for a viewpoint must be utilised, and that switching is not necessarily performed with the lowest-resolution video for a viewpoint as the target video.

Figure 2D:
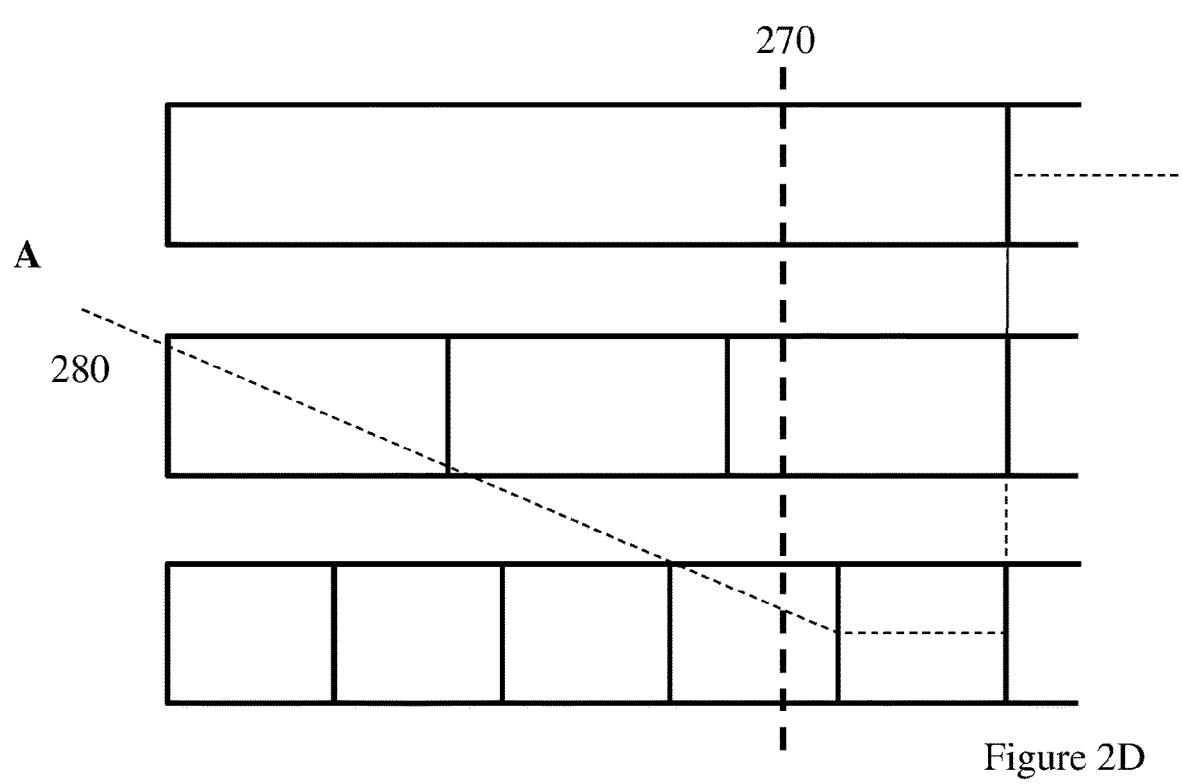

FIG. 2D schematically illustrates a further example of a video switching process using the same videos 200, 210, and 220 as in the Figures above. In this Figure, a video switching time 270 is used instead and a different line illustrates the video switching path 280.

The video switching time 270 occurs just before the GOP boundary separating the fourth and fifth GOPs of video 220, and so switching is performed at this boundary to transmit content from video 220. The next-occurring GOP boundary in the higher-resolution videos 200 and 210 is at the same time; in this case, a switch is performed to the highest-resolution video 200. This bypasses the video 210, resulting in fewer video switches needing to be performed and thus accelerating the video switching process. Any number of videos may be bypassed, if the next-occurring GOP boundary is in a video other than that of the next-highest quality.

In some embodiments, however, a switch may be performed to video 210 rather than switching directly to the highest-resolution video. This may be advantageous as switching from the lowest-resolution video to the highest-resolution video (or any significant change in resolution) may be jarring to the user, as it may highlight the fact that the resolution has changed. Having a smoother resolution gradient over time (i.e. switching only a single layer or another suitable threshold number of layers in a single switching action) may ease the user into the new viewpoint in a less disruptive manner.

Of course, should the video switching occur at a later time still in the GOP of the highest resolution video 200, the next-occurring GOP boundary may be in the highest-resolution video 200. In such a case, a video switching may be performed from a video corresponding to viewpoint A directly to the highest-resolution video 200 without transmitting the lower-resolution videos 210 and 220 at all.

In some embodiments, the next-occurring GOP boundary is the next-occurring after a threshold duration determined by a required video switching time. Effectively, the next suitable GOP boundary is selected, so as to allow for any processing time related to the switching to be performed (such as locating the correct video and performing any buffering or the like).

While in these Figures it is shown that the GOP duration for a video is proportional to the resolution, this is not essential. For example, an embodiment in which the video 220 has a shorter GOP duration than the video 230 could be provided; this would have the advantage of making it more likely that a higher-than-minimum resolution is selected when performing a video switch. In the examples above, this would indicate that a 2K video is the preferred lowest resolution, and the 1K video is less likely to be transmitted (and the duration for which it is transmitted would be reduced).

Figure 3:
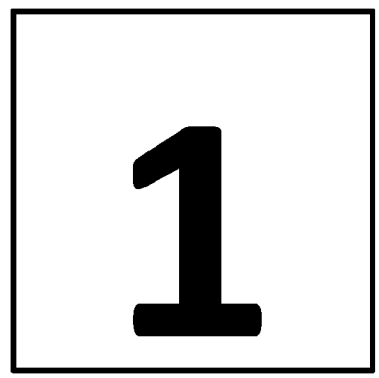
FIG. 3 schematically illustrates an example of video switching.
Figure 3:
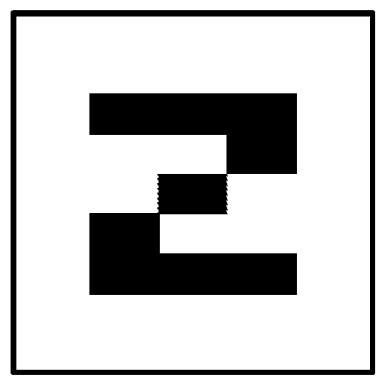
Figure 3:
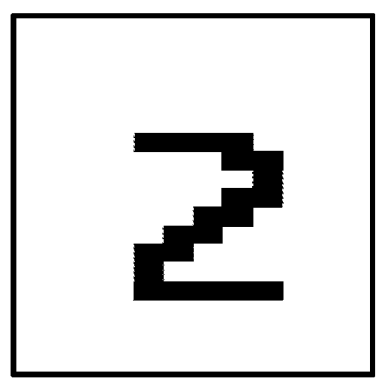
Figure 3:
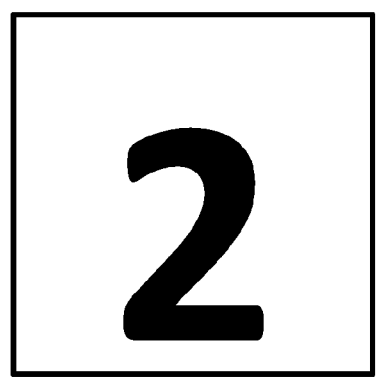

FIG. 3 schematically illustrates an example of a display to a viewer during a video switching process. The different images are displayed to a viewer sequentially (from top to bottom), although of course in many embodiments instead of a static image it would be video content being displayed.

The use of still images in the example here is purely for clarity, rather than being a limiting feature of the present arrangement. The clear visual difference between images of different resolutions here may not be so pronounced when this method is being utilised with video, as the resolution of even the lowest-resolution video may still be acceptable for displaying good quality images. For example, with reference to the videos described above, there is not a high degree of blockiness associated with a 1K image.

A first image 300 corresponds to a first viewpoint; for example, that of A with reference to the above Figures. This is a highest-quality image, as the viewer would generally be viewing the highest-resolution video content unless they are changing the requested viewpoint too rapidly for the disclosed method to proceed to display the highest-resolution content (in effect, changing viewpoint in a time shorter than that of the GOP duration of the highest-resolution video).

A second image 310 corresponds to the new viewpoint, and to the video stream 220 in the examples above. This is a lowest-resolution image that is recognisable, but would not be suitable for long-term display due to the blockiness; a user would not be satisfied with such a low image quality for extended periods.

A third image 320 also corresponds to the new viewpoint, and to the video stream 210 in the above examples. This image 320 is a higher resolution that the image 310, and thus much more recognisable by a viewer. However, it still suffers from having a lower-than-desirable resolution and as such may not be suitable for long-term display.

The fourth, and final, image 330 corresponds to the highest-resolution video 200 for that particular viewpoint. This is the clearest of the three images 310, 320 and 330, and therefore potentially the most suitable for long term viewing.

It is apparent that the simplified, and somewhat exaggerated in respect of the difference in resolution between images 310 and 330, nature of this example is not able to illustrate the advantages of the present arrangement to their full extent. Nevertheless, it would be apparent that if the viewer had changed their viewpoint to look at a '2' then they would find it less unsettling to view a low-resolution (but identifiable) '2' rather than to be stuck viewing '1' while waiting for the next GOP boundary. This is particularly true in embodiments in which the GOP duration is extended, for example so as to lower the bit rate of the video, and in which the lowest-resolution video is still of a sufficient quality so as to allow the content to be identified.

In some embodiments, a preferred lowest-resolution video may have the shortest GOP duration among the plurality of videos corresponding to a viewpoint. Using the videos in the example of FIG. 2A, a 2K video may be selected as a lowest preferred resolution as a resolution that is any lower may be too noticeable to a viewer. By decreasing the GOP duration of such a video, the likelihood of this being the target of an initial switch may be increased significantly as this video will have GOP boundaries occurring more frequently than videos of other resolutions.

Additionally, or alternatively, a plurality of videos may be stored with this lowest-preferred resolution. Each of these videos may have a different GOP duration, so as to increase the number of GOP boundaries for this resolution that are available as a video switching opportunity. Alternatively, or in addition, each of these videos may have an offset of the GOP boundaries with respect to one another; for example, the two videos could have the same GOP duration but with the GOP boundaries occurring at different times. In one example, a GOP duration of one second could be used, with a first video having GOP boundaries at the one/two/three (and so on) second marks and a second video having GOP boundaries at 1.5/2.5/3.5 (and so on) second marks.

The GOP duration for each video may be dependent upon the content of the video. For example, if a lower resolution image does not provide a significantly worse viewing experience for a viewer, then a low-resolution video for each viewpoint may have a short GOP duration while each higher-resolution video has a longer GOP in view of the reduced need for a fast video switching. An example of this is in viewing animated content; generally in a cartoon-style programme, a low quality video is more acceptable than in a video which is intended to present more life-like content. This provides advantages in that the higher-resolution videos may then have a reduced bit rate.

A GOP duration may be extended further in videos in which there is little motion; such video content is less likely to suffer from video artifacts and the like, and as a result the GOP duration may be extended without such a high chance of lowering the video quality. Equally, shorter GOP durations may be provided in content where a rapid change in videos is especially desirable—such as for sports events and the like—either for each video, or only a subset of videos, as is appropriate for the application.

Figure 4:
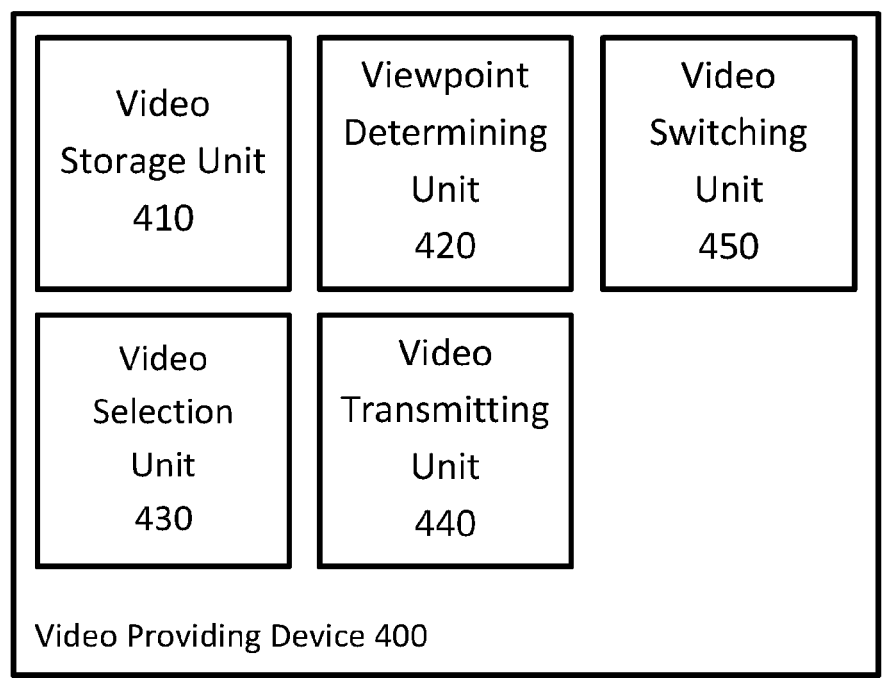
FIG. 4 schematically illustrates a video providing device.

FIG. 4 schematically illustrates a video providing device 400. The video providing device 400 is suitable for providing video content comprising a plurality of viewpoints. The video providing device 400 comprises a video storage unit 410, a viewpoint determining unit 320, a video selection unit 430, a video transmitting unit 440 and a video switching unit 450.

The video storage unit 410 is operable to store a plurality of versions of a video for each of a plurality of viewpoints in the video content, each video corresponding to the same viewpoint being encoded with a different resolution and a different group of pictures duration. The plurality of versions of a video may take the form of those shown in FIG. 2A, and are provided for each viewpoint in the content.

The viewpoint determining unit 420 is operable to determine a requested viewpoint in the video content; this could be using information identifying a particular viewpoint sent by a receiving device, or from position/orientation information about an HMD worn by a user or the like.

The video selection unit 430 is operable to select a video from amongst the plurality of versions corresponding to the requested viewpoint, the selected video having a next-occurring group of pictures boundary. Here, 'next-occurring' could refer to the next GOP boundary present in any of the videos corresponding to that viewpoint, or simply the next GOP boundary after a threshold delay to allow for buffering or the like to be performed so as to enable a smooth switching between videos.

The video transmitting unit 440 is operable to transmit the selected video to a video receiving device. This may be via any suitable transmission method, such as a wired or wireless connection.

The video switching unit 450 is operable to, if the selected video is not the highest-resolution video corresponding to that viewpoint, perform successive switches to higher-resolution videos at the next-occurring group of pictures boundary in a higher-resolution video until a switch is performed to the highest-resolution video for the determined viewpoint. The switching unit 450 is therefore operable to switch between videos that correspond to the same viewpoint. The video transmitting unit 440 is operable to transmit a switched video instead of the selected video, if such a switching is performed by the video switching unit 450.

In some embodiments, the video switching unit is operable to perform a switch to one of either the highest- or lowest-resolution videos which share a next-occurring group of pictures boundary time. As has been discussed above, the former of these is advantageous in that it can accelerate the process of reaching the highest-resolution video by skipping out intermediate videos. The latter is advantageous in that a more gradual switching is provided, which may be less jarring for a viewer.

Figure 5:
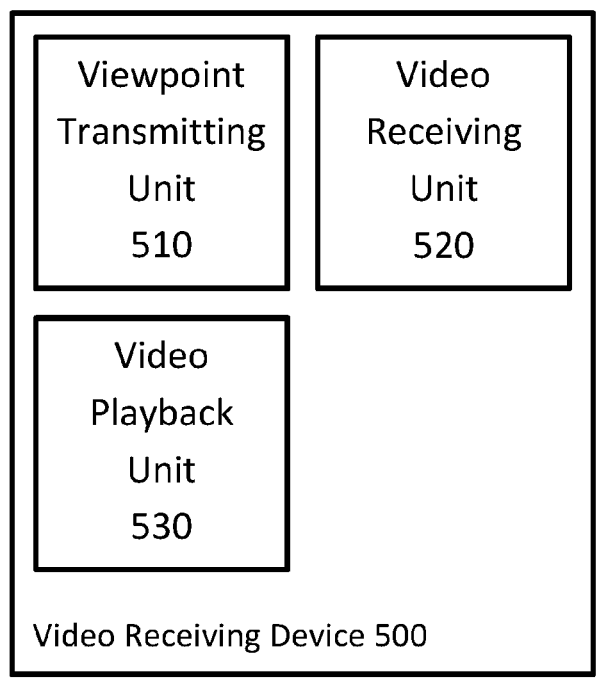
FIG. 5 schematically illustrates a video receiving device.

FIG. 5 schematically illustrates a video receiving device 500 for receiving video content comprising a plurality of viewpoints. The device comprises a viewpoint transmitting unit 510, a video receiving unit 520 and a video playback unit 530.

The viewpoint transmitting unit 510 is operable to transmit information identifying a requested viewpoint in the video content.

The video receiving unit 520 is operable to receive a video from a video processing device in dependence upon the requested viewpoint, the video being one of a plurality of versions of a video that are available for each of a plurality of viewpoints in the video content, each video corresponding to the same viewpoint being encoded with a different resolution and a different group of pictures duration. The received video is the one of the plurality of versions corresponding to the requested viewpoint having a next-occurring group of pictures boundary.

If the received video is not the highest-resolution video corresponding to that viewpoint, successive switches to higher-resolution videos are performed at the next-occurring group of pictures boundary in a higher-resolution video until a switch is performed to the highest-resolution video for the determined viewpoint, with a switched video being received by the video receiving device instead of the selected video.

While the functions are shown here to be distributed in a particular manner between the video providing device 400 and the video receiving device 500, it is apparent that various functions could instead be provided at either device. For example, given sufficient information about available videos (for example, viewpoint and GOP boundary information) it is possible that the video receiving device 500 could request a particular video of a particular resolution rather than this being selected solely by the video providing device 400.

Figure 6:
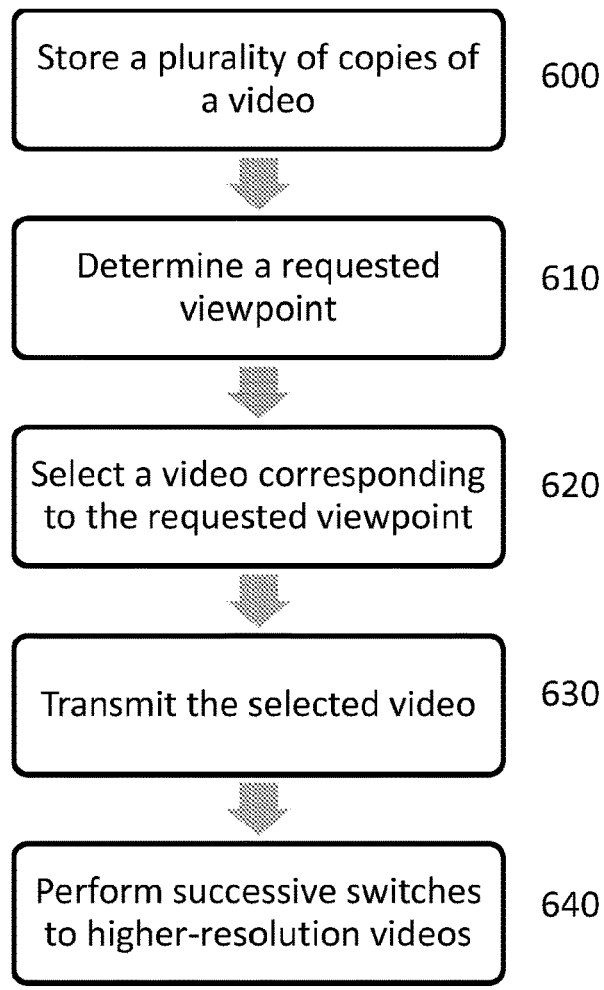
FIG. 6 schematically illustrates a video providing method.

FIG. 6 schematically illustrates a video providing method for providing video content comprising a plurality of viewpoints.

A step 600 comprises storing a plurality of versions of a video for each of a plurality of viewpoints in the video content, each video corresponding to the same viewpoint being encoded with a different resolution and a different group of pictures duration.

A step 610 comprises determining a requested viewpoint in the video content. The requested viewpoint may be determined based upon one or more of the position and/or orientation of the video receiving device, information specifying a viewpoint, or coordinates indicating a region of the video, for example.

A step 620 comprises selecting a video corresponding to the requested viewpoint with the next-occurring group of pictures boundary.

A step 630 comprises transmitting the selected video to a video receiving device.

A step 640 comprises performing, if the selected video is not the highest-resolution video corresponding to that viewpoint, successive switches to higher-resolution videos at the next-occurring group of pictures boundary in a higher-resolution video until a switch is performed to the highest-resolution video for the determined viewpoint. If such a switch is performed, a switched video instead of the selected video is transmitted in a transmitting step.

Figure 7:
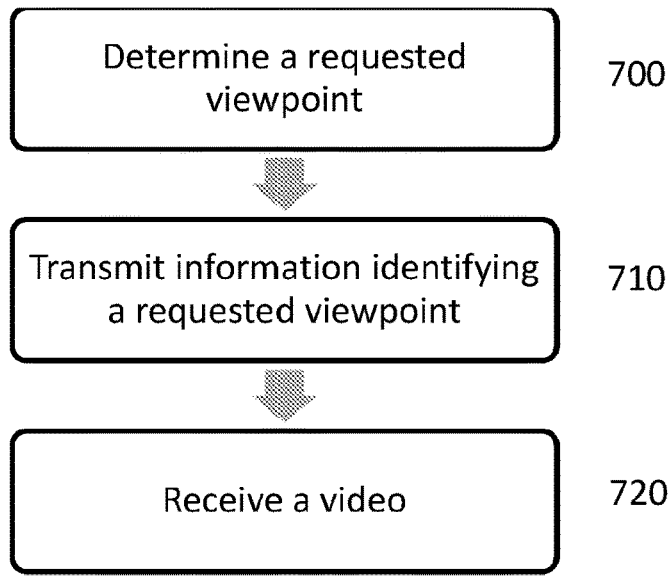
FIG. 7 schematically illustrates a video receiving method.

FIG. 7 schematically illustrates a video receiving method for receiving video content comprising a plurality of viewpoints.

A step 700 comprises determining a requested viewpoint in the video content, based upon one or more of the position and/or orientation of the video receiving device, information specifying a viewpoint, or coordinates indicating a region of the video, for example.

A step 710 comprises transmitting information identifying a requested viewpoint in the video content.

A step 720 comprises receiving a video from a video processing device in dependence upon the requested viewpoint, the video being one of a plurality of versions of a video that are available for each of a plurality of viewpoints in the video content, each video corresponding to the same viewpoint being encoded with a different resolution and a different group of pictures duration. The received video is the one of the plurality of versions corresponding to the requested viewpoint having a next-occurring group of pictures boundary.

If the received video is not the highest-resolution video corresponding to that viewpoint, successive switches to higher-resolution videos are performed at the next-occurring group of pictures boundary in a higher-resolution video until a switch is performed to the highest-resolution video for the determined viewpoint, with a switched video being received by the video receiving device instead of the selected video.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The invention claimed is:

1. A video providing device for providing video content comprising a plurality of viewpoints, the device comprising:
   a video storage unit operable to store a plurality of versions of a video for each of a plurality of viewpoints in the video content, each video corresponding to the same viewpoint being encoded with a different resolution and a different group of pictures duration, where the different group of pictures duration is a function of the different resolution;

a viewpoint determining unit operable to determine a requested viewpoint in the video content;

a video selection unit operable to select a video from amongst the plurality of versions corresponding to the requested viewpoint, the selected video having a next-occurring group of pictures boundary;

a video transmitting unit operable to transmit the selected video to a video receiving device; and a video switching unit operable to, if the selected video is not the highest-resolution video corresponding to that viewpoint, perform successive switches to higher-resolution videos at the next-occurring group of pictures boundary in a higher-resolution video until a switch is performed to the highest-resolution video for the determined viewpoint, wherein:

the video transmitting unit is operable to transmit a switched video instead of the selected video, and a plurality of videos are stored with a preferred lowest-resolution, each video having a different GOP duration.

2. A video providing device according to claim 1, wherein videos having a higher resolution also have a longer GOP duration.

3. A video providing device according to claim 1, wherein a preferred lowest-resolution video has the shortest GOP duration among the plurality of videos corresponding to a viewpoint.

4. A video providing device according to claim 1, wherein the video switching unit is operable to perform a switch to one of either the highest- or lowest-resolution videos which share a next-occurring group of pictures boundary time.

5. A video providing device according to claim 1, wherein the group of pictures duration for each video is dependent upon the content of the video.

6. A video providing device according to claim 1, wherein the next-occurring group of pictures boundary is the next-occurring after a threshold duration determined by a required video switching time.

7. A video providing device according to claim 1, wherein a plurality of videos are stored with a preferred lowest-resolution, each video having an offset in the group of pictures boundaries with respect to one another.

8. A video providing device according to claim 1, wherein there are six viewpoints, representing a cube mapping of the video.

9. A video providing device according to claim 1, wherein the requested viewpoint is determined based upon one or more of: the position and/or orientation of the video receiving device, information specifying a viewpoint, or coordinates indicating a region of the video.

10. A video providing device according to claim 1, wherein the video receiving device is associated with a head-mountable display.

11. A video receiving device for receiving video content comprising a plurality of viewpoints, the device comprising:

a viewpoint transmitting unit operable to transmit information identifying a requested viewpoint in the video content; and a video receiving unit operable to receive a video from a video processing device in dependence upon the requested viewpoint, the video being one of a plurality of versions of a video that are available for each of a plurality of viewpoints in the video content, each video corresponding to the same viewpoint being encoded with a different resolution and a different group of pictures duration, where the different group of pictures duration is a function of the different resolution, wherein the received video is the one of the plurality of versions corresponding to the requested viewpoint having a next-occurring group of pictures boundary, and wherein if the received video is not the highest-resolution video corresponding to that viewpoint, successive switches to higher-resolution videos are performed at the next-occurring group of pictures boundary in a higher-resolution video until a switch is performed to the highest-resolution video for the determined viewpoint, with a switched video being received by the video receiving device instead of the selected video, wherein a plurality of videos are stored with a preferred lowest-resolution, each video having a different GOP duration.

12. A video providing method for providing video content comprising a plurality of viewpoints, the method comprising:

storing a plurality of versions of a video for each of a plurality of viewpoints in the video content, each video corresponding to the same viewpoint being encoded with a different resolution and a different group of pictures duration, where the different group of pictures duration is a function of the different resolution;

determining a requested viewpoint in the video content;

selecting a video corresponding to the requested viewpoint with the next-occurring group of pictures boundary;

transmitting the selected video to a video receiving device;

performing, if the selected video is not the highest-resolution video corresponding to that viewpoint, successive switches to higher-resolution videos at the next-occurring group of pictures boundary in a higher-resolution video until a switch is performed to the highest-resolution video for the determined viewpoint; and transmitting a switched video instead of the selected video, wherein a plurality of videos are stored with a preferred lowest-resolution, each video having a different GOP duration.

13. A video receiving method for receiving video content comprising a plurality of viewpoints, the method comprising:

transmitting information identifying a requested viewpoint in the video content; and receiving a video from a video processing device in dependence upon the requested viewpoint, the video being one of a plurality of versions of a video that are available for each of a plurality of viewpoints in the video content, each video corresponding to the same viewpoint being encoded with a different resolution and a different group of pictures duration, where the different group of pictures duration is a function of the different resolution, wherein a received video is the one of the plurality of versions corresponding to the requested viewpoint having a next-occurring group of pictures boundary, wherein if the received video is not the highest-resolution video corresponding to that viewpoint, successive switches to higher-resolution videos are performed at the next-occurring group of pictures boundary in a higher-resolution video until a switch is performed to the highest-resolution video for the determined viewpoint, with a switched video being received by the video receiving device instead of the selected video, and wherein a plurality of videos are stored with a preferred lowest-resolution, each video having a different GOP duration.

14. A non-transitory, computer readable storage medium containing a computer program which, when executed by a computer, causes the computer to execute a video providing method for providing video content comprising a plurality of viewpoints, the method comprising:

storing a plurality of versions of a video for each of a plurality of viewpoints in the video content, each video corresponding to the same viewpoint being encoded with a different resolution and a different group of pictures duration, where the different group of pictures duration is a function of the different resolution;

determining a requested viewpoint in the video content;

selecting a video corresponding to the requested viewpoint with the next-occurring group of pictures boundary;

transmitting the selected video to a video receiving device;

performing, if the selected video is not the highest-resolution video corresponding to that viewpoint, successive switches to higher-resolution videos at the next-occurring group of pictures boundary in a higher-resolution video until a switch is performed to the highest-resolution video for the determined viewpoint; and transmitting a switched video instead of the selected video, wherein a plurality of videos are stored with a preferred lowest-resolution, each video having a different GOP duration.

15. A non-transitory, computer readable storage medium containing a computer program which, when executed by a computer, causes the computer to execute a video receiving method for receiving video content comprising a plurality of viewpoints, the method comprising:

transmitting information identifying a requested viewpoint in the video content; and receiving a video from a video processing device in dependence upon the requested viewpoint, the video being one of a plurality of versions of a video that are available for each of a plurality of viewpoints in the video content, each video corresponding to the same viewpoint being encoded with a different resolution and a different group of pictures duration, where the different group of pictures duration is a function of the different resolution, wherein a received video is the one of the plurality of versions corresponding to the requested viewpoint having a next-occurring group of pictures boundary, wherein if the received video is not the highest-resolution video corresponding to that viewpoint, successive switches to higher-resolution videos are performed at the next-occurring group of pictures boundary in a higher-resolution video until a switch is performed to the highest-resolution video for the determined viewpoint, with a switched video being received by the video receiving device instead of the selected video, and wherein a plurality of videos are stored with a preferred lowest-resolution, each video having a different GOP duration.

\* \* \* \* \*